(12) United States Patent
Wu et al.

(10) Patent No.: US 9,407,555 B2
(45) Date of Patent: Aug. 2, 2016

(54) SYSTEMS AND METHODS FOR LOAD BALANCING MULTICAST TRAFFIC

(71) Applicant: Juniper Networks, Inc., Sunnyvale, CA (US)

(72) Inventors: Qiang Wu, Sunnyvale, CA (US); Xichun Hong, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 78 days.

(21) Appl. No.: 14/231,225

(22) Filed: Mar. 31, 2014

(65) Prior Publication Data

US 2015/0281090 A1     Oct. 1, 2015

(51) Int. Cl.
| | | |
|---|---|---|
| *H04L 12/803* | (2013.01) | |
| *H04L 12/18* | (2006.01) | |
| *H04L 12/761* | (2013.01) | |
| *H04L 12/707* | (2013.01) | |

(52) U.S. Cl.
CPC .............. *H04L 47/125* (2013.01); *H04L 12/18* (2013.01); *H04L 45/16* (2013.01); *H04L 45/22* (2013.01)

(58) Field of Classification Search
None
See application file for complete search history.

(56) References Cited

U.S. PATENT DOCUMENTS

| | | |
|---|---|---|
| 6,697,333 B1 | 2/2004 | Bawa et al. |
| 8,787,400 B1 | 7/2014 | Barth et al. |
| 2002/0085506 A1* | 7/2002 | Hundscheidt ......... H04L 12/185 370/254 |
| 2003/0012130 A1* | 1/2003 | Novaes ............... H04L 12/1854 370/218 |

(Continued)

FOREIGN PATENT DOCUMENTS

EP     2658192     10/2013

OTHER PUBLICATIONS

Apoorva Jindal, et al; Systems and Methods for Increasing the Scalability of Software-Defined Networks; U.S. Appl. No. 13/936,033, filed Jul. 5, 2013.

(Continued)

*Primary Examiner* — Jenee Williams
(74) *Attorney, Agent, or Firm* — ALG Intellectual Property, LLC

(57) ABSTRACT

A computer-implemented method for load balancing multicast traffic may include (1) identifying a plurality of switches that include at least a first switch that is connected to a second switch by a first path and a second path, (2) calculating a plurality of multicast distribution trees for distributing multicast traffic among the plurality of switches that includes (i) a first tree that includes the first path and whose root is different than the root of a second tree and (ii) the second tree that includes the second path, (3) receiving a plurality of multicast packets ingress to the plurality of switches at the first switch, and (4) using at least two of the plurality of multicast distribution trees to transmit the plurality of multicast packets from the first switch to the second switch. Various other methods, systems, and computer-readable media are also disclosed.

20 Claims, 8 Drawing Sheets

(56) References Cited

U.S. PATENT DOCUMENTS

| | | | | |
|---|---|---|---|---|
| 2003/0012146 | A1* | 1/2003 | Novaes | H04L 12/185 370/255 |
| 2003/0016624 | A1* | 1/2003 | Bare | H04L 29/12009 370/217 |
| 2005/0041665 | A1* | 2/2005 | Weyman | H04L 45/04 370/390 |
| 2005/0180448 | A1* | 8/2005 | Kobayashi | H04L 12/185 370/432 |
| 2005/0201278 | A1* | 9/2005 | Banerjee | H04L 12/18 370/229 |
| 2006/0018253 | A1* | 1/2006 | Windisch | H04L 45/00 370/216 |
| 2006/0062211 | A1* | 3/2006 | Manthoulis | G06Q 10/067 370/386 |
| 2006/0193332 | A1* | 8/2006 | Qian | H04L 12/18 370/397 |
| 2006/0203819 | A1* | 9/2006 | Farinacci | H04L 45/00 370/390 |
| 2007/0140107 | A1* | 6/2007 | Eckert | H04L 12/18 370/216 |
| 2007/0177525 | A1* | 8/2007 | Wijnands | H04L 12/18 370/254 |
| 2008/0205394 | A1* | 8/2008 | Deshpande | H04L 12/1854 370/390 |
| 2008/0212584 | A1* | 9/2008 | Breslau | H04L 12/18 370/390 |
| 2008/0219237 | A1* | 9/2008 | Thubert | H04L 45/16 370/349 |
| 2009/0067426 | A1* | 3/2009 | Ko | H04L 12/185 370/390 |
| 2011/0231833 | A1* | 9/2011 | Narayanan | G06F 9/4416 717/171 |
| 2011/0235638 | A1* | 9/2011 | Bonda | H04L 12/18 370/390 |
| 2011/0255421 | A1* | 10/2011 | Shrirang | H04L 43/0894 370/244 |
| 2011/0280159 | A1* | 11/2011 | Miller | H04L 12/4625 370/256 |
| 2013/0286817 | A1 | 10/2013 | Allan | |
| 2014/0056178 | A1 | 2/2014 | Tsai et al. | |
| 2014/0071987 | A1 | 3/2014 | Janardhanan et al. | |

OTHER PUBLICATIONS

Anuj Anand Mittal, et al; Systems and Methods for Testing and Analyzing Controller-Based Networks; U.S. Appl. No. 13/901,554, filed May 23, 2013.

Kent A. Watsen; Systems and Methods for Managing Device Configurations at Various Levels of Abstraction; U.S. Appl. No. 14/040,593, filed Sep. 27, 2013.

Jian Chen, et al; Systems and Methods for Preventing Split-Brain Scenarios in High-Availability Clusters; U.S. Appl. No. 14/146,804, filed Jan. 3, 2014.

Kamatchi Soundaram Gopalakrishnan; Systems and Methods for Improving Clock Synchronization Between Master and Slave Devices; U.S. Appl. No. 14/146,830, filed Jan. 3, 2014.

Craig R. Frink, et al; Apparatus, System, and Method for Increasing Scheduling Efficiency in Network Devices; U.S. Appl. No. 14/146,914, filed Jan. 3, 2014.

Eswaran Srinivasan, et al; Systems and Methods for Mitigating Network Congestion; U.S. Appl. No. 14/146,864, filed Jan. 3, 2014.

"A New Cloud Network "Spline™" Is Born", http://www.aristanetworks.com/en/blogs/?p=907, as accessed Feb. 12, 2014, Arista Networks, Inc., (Nov. 4, 2013).

Apoorva Jindal, et al.; Systems and Methods for Interfacing Software-Defined Networks With Non-Software-Defined Networks; U.S. Appl. No. 14/231,493, filed Mar. 31, 2014.

Qiang Wu; Systems and Methods for Multipath Load Balancing; U.S. Appl. No. 14/229,958, filed Mar. 30, 2014.

* cited by examiner

SYSTEMS AND METHODS FOR LOAD BALANCING MULTICAST TRAFFIC

BACKGROUND

Traditional techniques for distributing multicast traffic within layer-2 networks have generally relied on the Spanning Tree Protocol to prevent multicast packets from looping in and flooding the layer-2 networks. Unfortunately while successfully eliminating looping, the Spanning Tree Protocol may constrain multicast traffic to a single set of data links, which may cause redundant data links to be unused.

Some techniques for distributing multicast traffic have attempted to use more than one set of data links to distribute multicast traffic in layer-2 networks. For example, at least one technique may allocate a set of data links to each switch in a layer-2 network that may include the shortest paths from the switch to other switches in the layer-2 network and may be used to distribute multicast traffic ingress to the layer-2 network at the switch to the other switches within the layer-2 network. Because each switch is allocated its own set of data links, multicast traffic ingress to the layer-2 network at two different switches may be distributed using different sets of data links. Unfortunately, data link utilization may be inefficient as only a single path may be used for distributing traffic between any two switches. Thus, the instant disclosure identifies and addresses a need for improved systems and methods for load balancing multicast traffic.

SUMMARY

As will be described in greater detail below, the instant disclosure generally relates to systems and methods for load balancing multicast traffic across the data links that interconnect a network of switches, such as a network of switches that make up a virtual-chassis fabric. In one example, a computer-implemented method for load balancing multicast traffic may include (1) identifying a plurality of switches that include at least a first switch that is connected to a second switch by a first path and a second path, (2) calculating a plurality of multicast distribution trees for distributing multicast traffic among the plurality of switches that include (i) a first tree that includes the first path and whose root is different than the root of a second tree and (ii) the second tree that includes the second path, (3) receiving a plurality of multicast packets ingress to the plurality of switches at the first switch, and (4) using at least two of the plurality of multicast distribution trees to transmit the plurality of multicast packets from the first switch to the second switch.

Similarly, a system incorporating the above-described method may include (1) an identifying module that identifies a plurality of switches that include at least a first switch that is connected to a second switch by a first path and a second path, (2) a calculating module that calculates a plurality of multicast distribution trees for distributing multicast traffic among the plurality of switches that include at least (i) a first tree that includes the first path and whose root is different than the root of a second tree and (ii) the second tree that includes the second path, (3) a receiving module that receives a plurality of multicast packets ingress to the plurality of switches at the first switch, (4) a transmitting module that uses at least two of the plurality of multicast distribution trees to transmit the plurality of multicast packets from the first switch to the second switch, and (5) at least one physical processor that executes the identifying module, the calculating module, the receiving module, and the transmitting module.

A corresponding non-transitory computer-readable medium may include one or more computer-readable instructions that may, when executed by at least one processor of a network device, cause the network device to (1) identify a plurality of switches that include at least a first switch that is connected to a second switch by a first path and a second path, (2) calculate a plurality of multicast distribution trees for distributing multicast traffic among the plurality of switches that include (i) a first tree that includes the first path and whose root is different than the root of a second tree and (ii) the second tree that includes the second path, (3) receive a plurality of multicast packets ingress to the plurality of switches at the first switch, and (4) use at least two of the plurality of multicast distribution trees to transmit the plurality of multicast packets from the first switch to the second switch.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
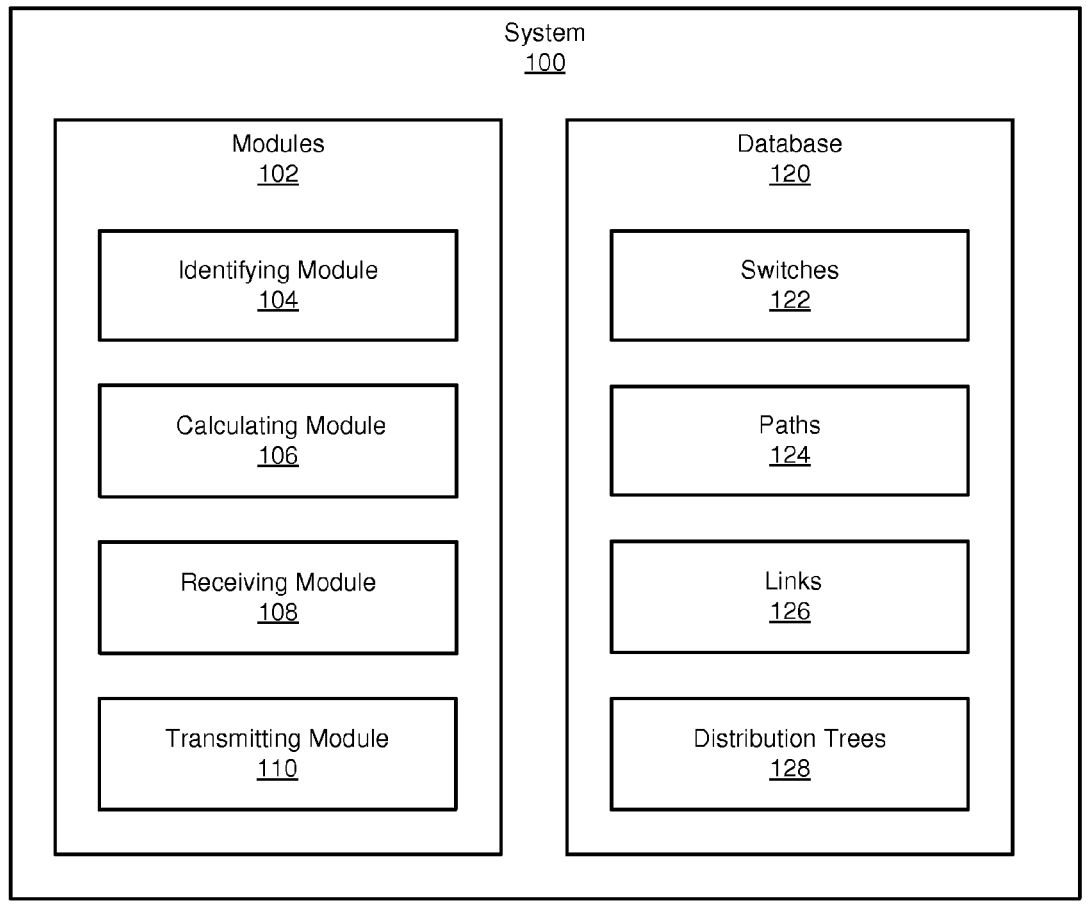
FIG. 1 is a block diagram of an exemplary system for load balancing multicast traffic.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for using multicast distribution trees to load balance multicast traffic across the data links that interconnect a network of switches, such as a network of switches that make up a virtual-chassis fabric. Embodiments of the instant disclosure may compute two or more multicast distribution trees that are rooted on particular switches in a network and may balance multicast traffic ingress to the network at any one switch in the network across two or more of these multicast distribution trees.

As will be explained in greater detail below, by load balancing multicast traffic across multiple multicast distribution trees, embodiments of the instant disclosure may substantially improve data-link utilization. For example, by generating multicast distribution trees that may include paths to all switches in a network, embodiments of the instant disclosure may forward multicast packets ingress on a switch from outside of the network to any destination switch in the network along any of the multicast distribution trees. Moreover, by assigning multicast-packet flows (e.g., the multicast-packet flow of a particular Virtual Local Area Network (VLAN)) to multiple multicast distribution trees, embodiments of the instant disclosure may distribute multicast packets ingress on any one switch in a network using different multicast distribution trees and different data links and/or may distribute multicast packets ingress on different switches in the network using the same multicast distribution tree and the same data links. Embodiments of the instant disclosure may also provide various other advantages and features, as discussed in greater detail below.

Figure 2:
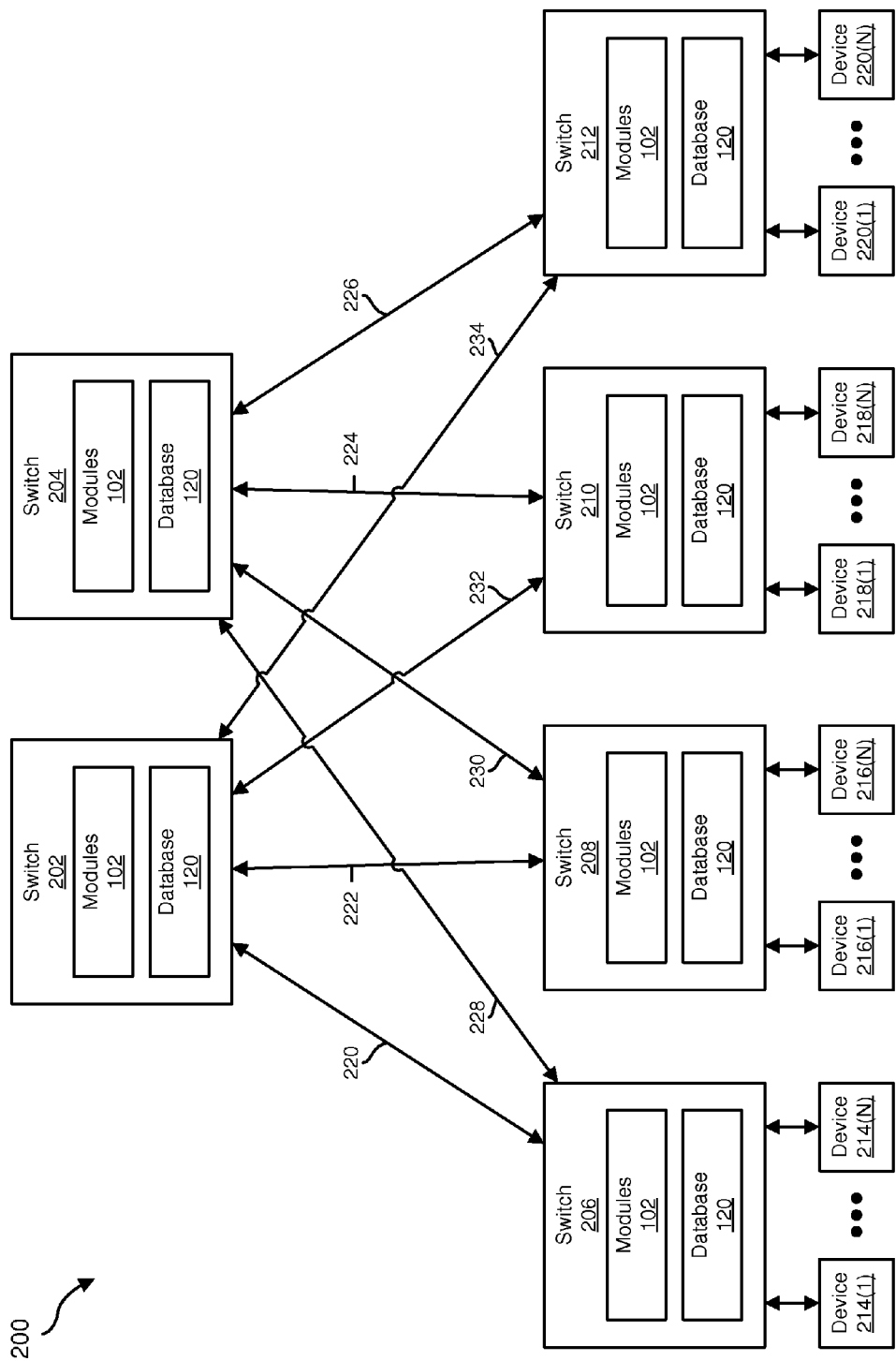
FIG. 2 is a block diagram of an exemplary system for load balancing multicast traffic.

The following will provide, with reference to FIGS. 1 and 2 detailed descriptions of exemplary systems for load balancing multicast traffic. More particularly, the discussions corresponding to FIGS. 1 and 2 provide a general overview of components of a load-balancing framework for distributing multicast traffic across the data links that interconnect a network of switches. Detailed descriptions of corresponding computer-implemented methods will also be provided in connection with FIGS. 3-7. In addition, detailed descriptions of an exemplary computing system capable of implementing one or more of the embodiments described herein will be provided in connection with FIG. 8.

FIG. 1 is a block diagram of an exemplary system 100 for load balancing multicast traffic. As illustrated in this figure, exemplary system 100 may include one or more modules 102 for performing one or more tasks. For example, and as will be explained in greater detail below, exemplary system 100 may include an identifying module 104 that identifies a plurality of switches that include at least a first switch that is connected to a second switch by a first path and a second path. Exemplary system 100 may also include a calculating module 106 that calculates a plurality of multicast distribution trees for distributing multicast traffic among the plurality of switches that include at least (i) a first tree that includes the first path and whose root is different than the root of a second tree and (ii) the second tree that includes the second path.

In addition, and as will be described in greater detail below, exemplary system 100 may include a receiving module 108 that receives a plurality of multicast packets ingress to the plurality of switches at the first switch. Exemplary system 100 may also include a calculating module 106 that uses at least two of the plurality of multicast distribution trees to transmit the plurality of multicast packets from the first switch to the second switch. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., switches 202-212) and/or computing system 800 in FIG. 8. One or more of modules 102 in FIG. 1 may also represent all or portions of one or more special-purpose computers configured to perform one or more tasks. In at least one example, one or more of modules 102 in FIG. 1 may represent all or portions of a system that load balances multicast traffic across the data links that interconnect a network of switches that make up a virtual-chassis fabric (e.g., a collection of switches that behave as a single logical switch).

As illustrated in FIG. 1, exemplary system 100 may also include one or more databases, such as database 120. In one example, database 120 may include switches 122 for storing configuration information about switches, paths 124 for storing information about the paths that connect the switches, data links 126 for storing information about the data links that make up the paths, and distribution trees 126 for storing information about distribution trees used to load balance multicast traffic across the data links and/or paths that interconnect the switches. In at least one example, database 120 may represent all or portion of a link-state database.

Database 120 may represent portions of a single database or computing device or a plurality of databases or computing devices. For example, database 120 may represent a portion of switches 202-212 in FIG. 2 and/or computing system 800 in FIG. 8. Alternatively, database 120 in FIG. 1 may represent one or more physically separate devices capable of being accessed by a computing device, such as switches 202-212 in FIG. 2 and/or computing system 800 in FIG. 8. In at least one example, database 120 may represent control plane data, which may include any type or form of data or code related to controlling the movement of multicast packets within a network of switches.

Exemplary system 100 in FIG. 1 may be implemented in a variety of ways. For example, all or a portion of exemplary system 100 may represent portions of exemplary network 200 in FIG. 2. As shown in FIG. 2, network 200 may include switches 202-212 interconnected via data links 220-234. In some examples, one or more of switches 202-212 may be programmed with one or more of modules 102 and/or may store all or a portion of the data in database 120.

In one embodiment, one or more of modules 102 from FIG. 1 may, when executed by at least one processor of switches 202-212, cause one or more of switches 202-212 to load balance multicast traffic across data links 220-234. For example, and as will be described in greater detail below, one or more of modules 102 may cause one or more of switches 202-212 to (1) identify each of switches 202-212 and the paths that interconnect switches 202-212, (2) calculate a plurality of multicast distribution trees for distributing multicast traffic among the paths that interconnect switches 202-212, (3) receive multicast packets from device 214(1) and ingress to switches 202-212 at switch 206, and (4) use at least two of the multicast distribution trees to transmit the multicast packets to one or more of switches 202, 204, and/or 208-212.

Switches 202-212 generally represent any intermediary computing device that connects network segments or network devices and/or facilitates communication between two or more other computing devices within a computing environment. For example as shown in FIG. 2, switches 202-212 in FIG. 2 may facilitate communication between devices 214(1)-(N), 216(1)-(N), 218(1)-(N), and 220(1)-(N). Examples of switches 202-212 include, without limitation, packet switches, network bridges, multilayer switches, network hubs, signal repeaters, routers, and/or any other suitable switching devices. In some examples, switches 202-212 may represent all or a portion of a layer-2 network. In at least one example, switches 202-212 may represent a virtual-chassis fabric.

As shown in FIG. 2, switches 202-212 may be interconnected via data links 220-234. Data links 220-234 generally represent any medium or architecture capable of facilitating communication or data transfer. Each of data links 220-234 may represent a physical connection (e.g., via a wire or cable) between the data ports of two switches in network 200.

Computing devices 214(1)-(N), 216(1)-(N), 218(1)-(N), and 220(1)-(N) generally represent any type or form of computing device capable of reading computer-executable instructions. Examples of computing devices 214(1)-(N), 216(1)-(N), 218(1)-(N), and 220(1)-(N) include, without limitation, laptops, tablets, desktops, servers, cellular phones, Personal Digital Assistants (PDAs), multimedia players, embedded systems, network devices, application servers, web servers, storage servers, deduplication servers, database servers, exemplary computing system 800 in FIG. 8, combinations of one or more of the same, or any other suitable computing devices.

Figure 3:
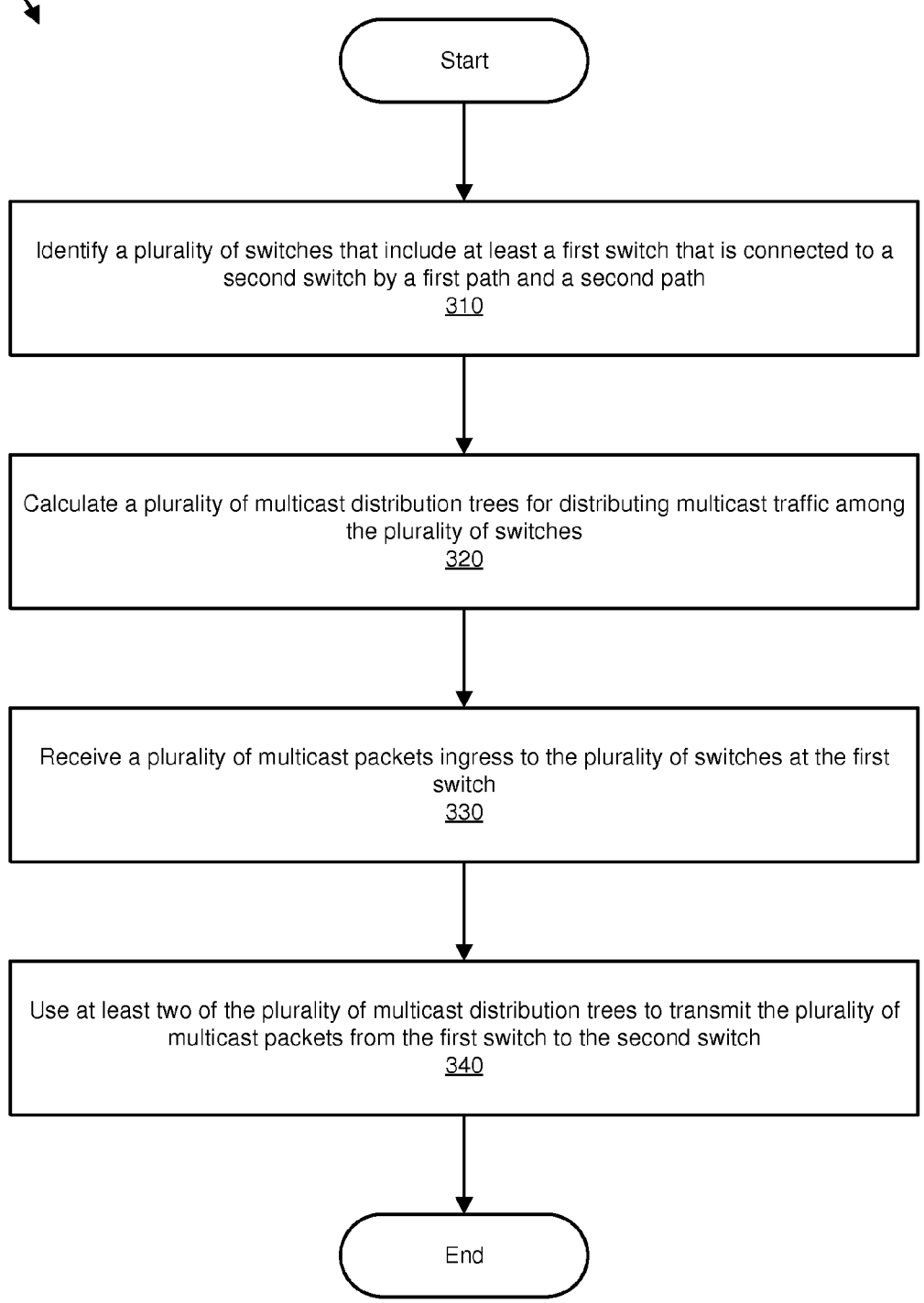
FIG. 3 is a flow diagram of an exemplary method for load balancing multicast traffic.

FIG. 3 is a flow diagram of an exemplary computer-implemented method 300 for load balancing multicast traffic. The steps shown in FIG. 3 may be performed by any suitable computer-executable code and/or computing system. In some embodiments, the steps shown in FIG. 3 may be performed by one or more of the components of system 100 in FIG. 1, network 200 in FIG. 2, and/or computing system 800 in FIG. 8.

As illustrated in FIG. 3, at step 310 one or more of the systems described herein may identify a plurality of switches that include at least a first switch that is connected to a second switch by a first path and a second path. For example, at step 310 identifying module 104 may, as part of one or more of switches 202-212 in FIG. 2, identify switch 206 that is connected to switch 212 by a path through switch 202 via data links 220 and 234 and a path through switch 204 via data links 228 and 226.

As used herein, the term "switch" generally refers to any device, system, or application capable of routing or forwarding information, which may be in the form of packets, among devices of a computing network. Two switches in a network may be connected via one or more data links and/or paths. As used herein, the phrase "data link" may refer to any physical or logical connection between two devices in a network. For example, the phrase "data link" may refer to the physical connection between two switches whose physical ports are connected via a physical wire or cable. Examples of data links include data links 220-234 in FIG. 2. The term "path," as used herein may refer to any route between to devices in a network. In at least one example, the term "path" may refer to a shortest or lowest cost path. In general, a path may be made up of one or more data links. Using FIG. 2 as an example, switch 206 may be connected to switch 212 by a path through switch 202 via data links 220 and 234 and a path through switch 204 via data links 228 and 226.

In some situations, multiple switches may be combined to form a virtual-chassis fabric (e.g., a virtual switch fabric) that may behave as a single logical switch. As used herein, the phrase "virtual-chassis fabric" generally refers to a collection of interconnected switches that may function and/or be managed as a single, logical device. In general, the switches within a virtual-chassis fabric may interconnect incoming data from ingress ports of the virtual-chassis fabric to egress ports of the virtual-chassis fabric. In some instances, a virtual-chassis fabric may facilitate a high level of scalability by providing any-to-any connectivity among nodes (e.g., switches) within the virtual-chassis fabric. Moreover, a virtual-chassis fabric may facilitate high availability by providing redundant switches and/or redundant data links. In some examples, the topology of the switches that make up a virtual-chassis fabric may not be restricted.

Returning to FIG. 3, the systems described herein may perform step 310 in a variety of ways. In general, identifying module 104 may, as part of one or more of the switches within a network, use a suitable link-state routing protocol (such as, e.g., Open Shortest Path First (OSPF) or Intermediate System To Intermediate System (IS-IS)) to exchange and accumulate topology information that describes the network. Using FIG. 2 as an example, identifying module 104 may, as part of each of switches 202-212, use a suitable link-state routing protocol to exchange and accumulate topology information that identifies each of switches 202-212 and that describes how they are connected by data links 220-234.

Figure 4:
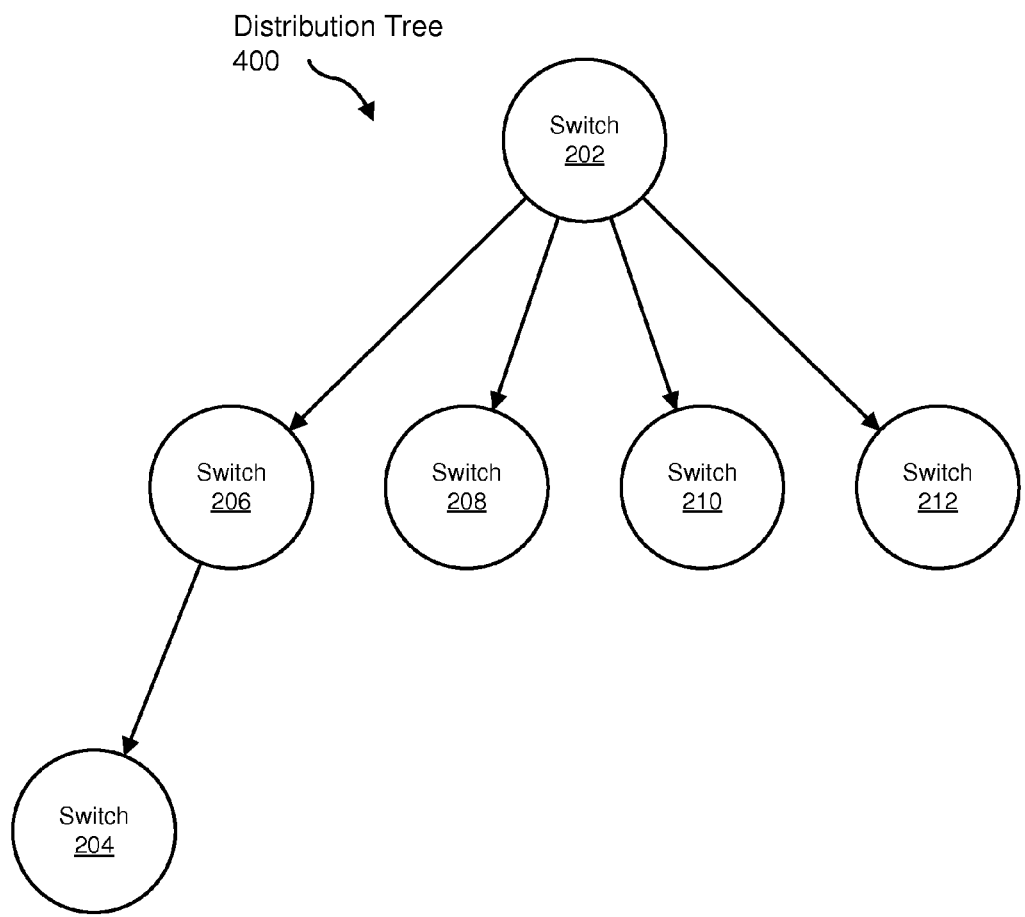
FIG. 4 is a block diagram of an exemplary multicast distribution tree for load balancing multicast traffic.
Figure 5:
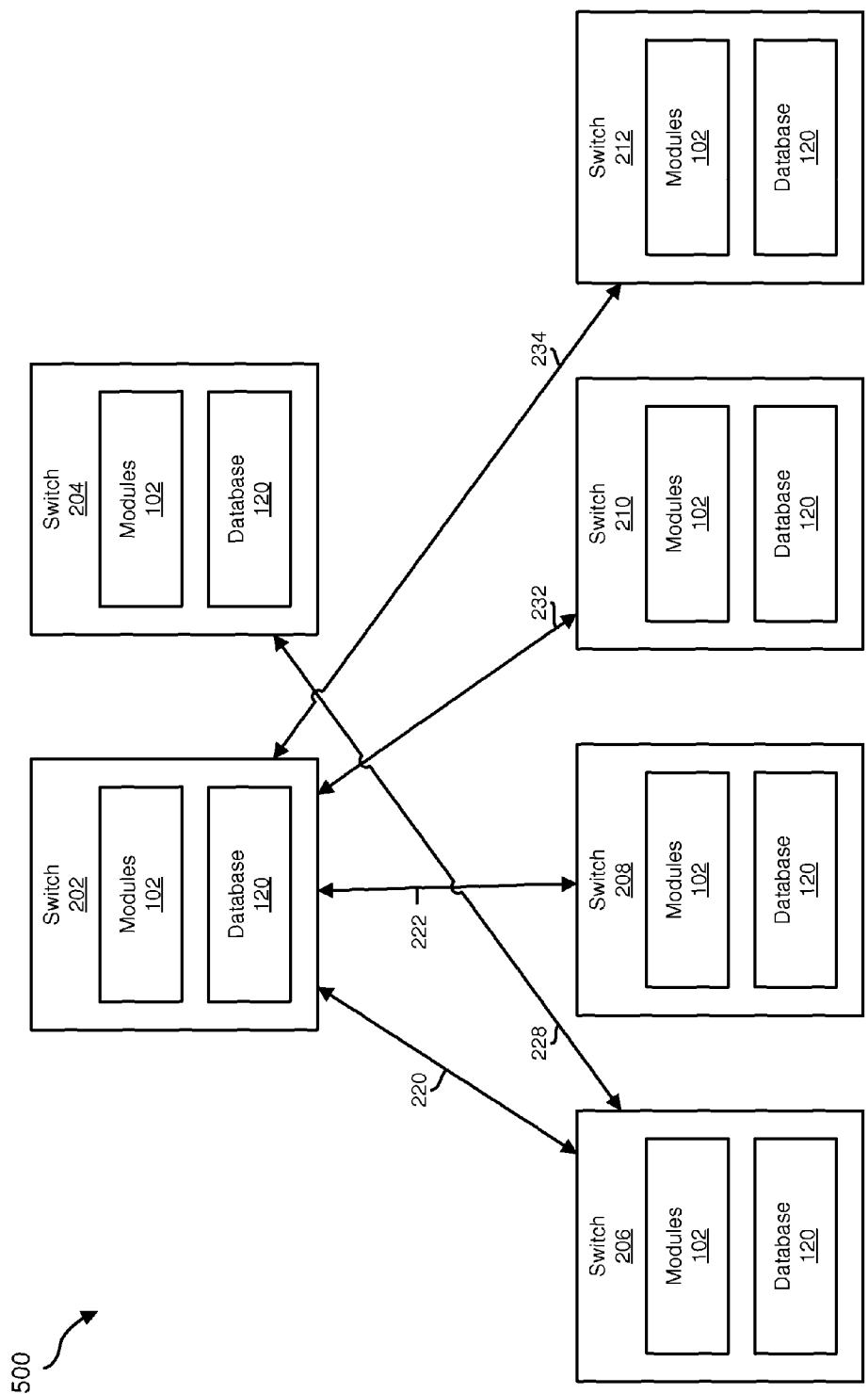
FIG. 5 is a block diagram of an exemplary system for load balancing multicast traffic.
Figure 6:
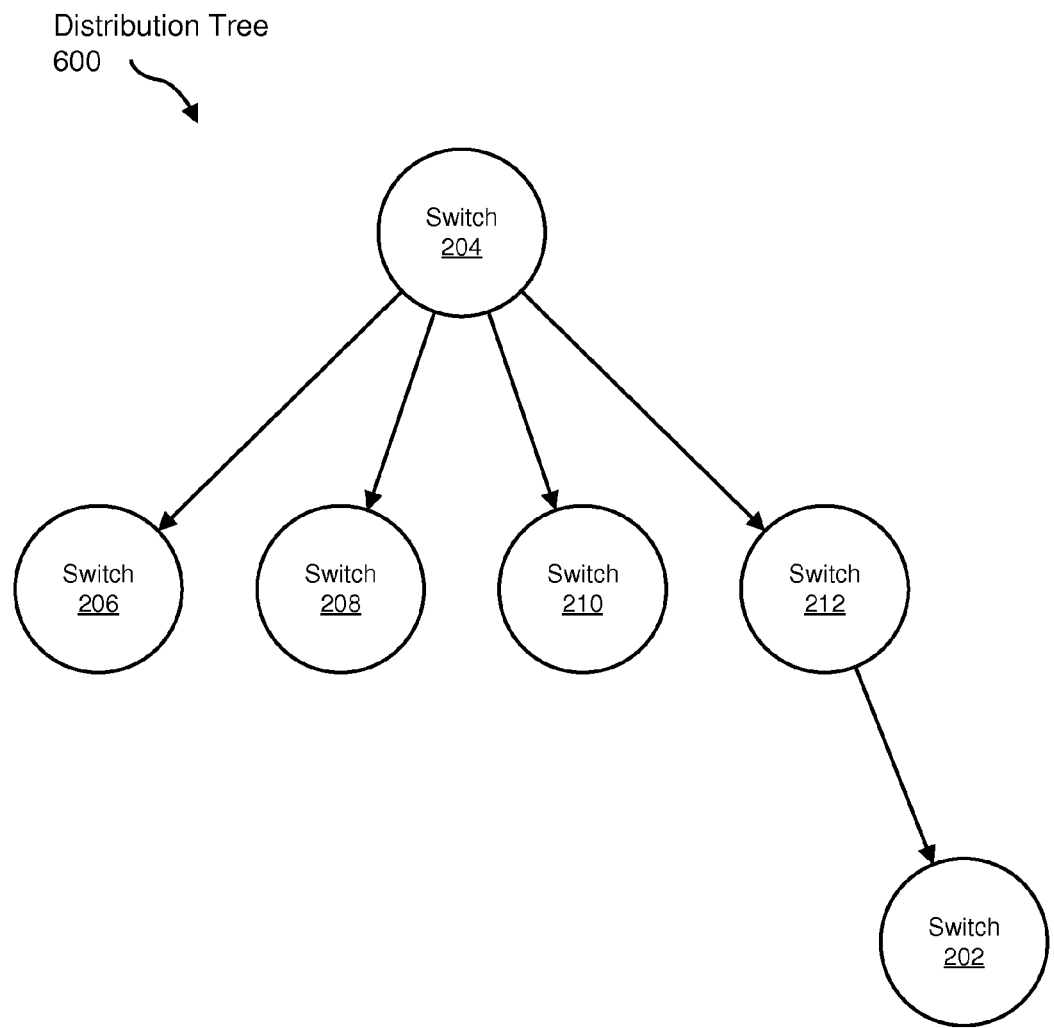
FIG. 6 is a block diagram of an exemplary multicast distribution tree for load balancing multicast traffic.
Figure 7:
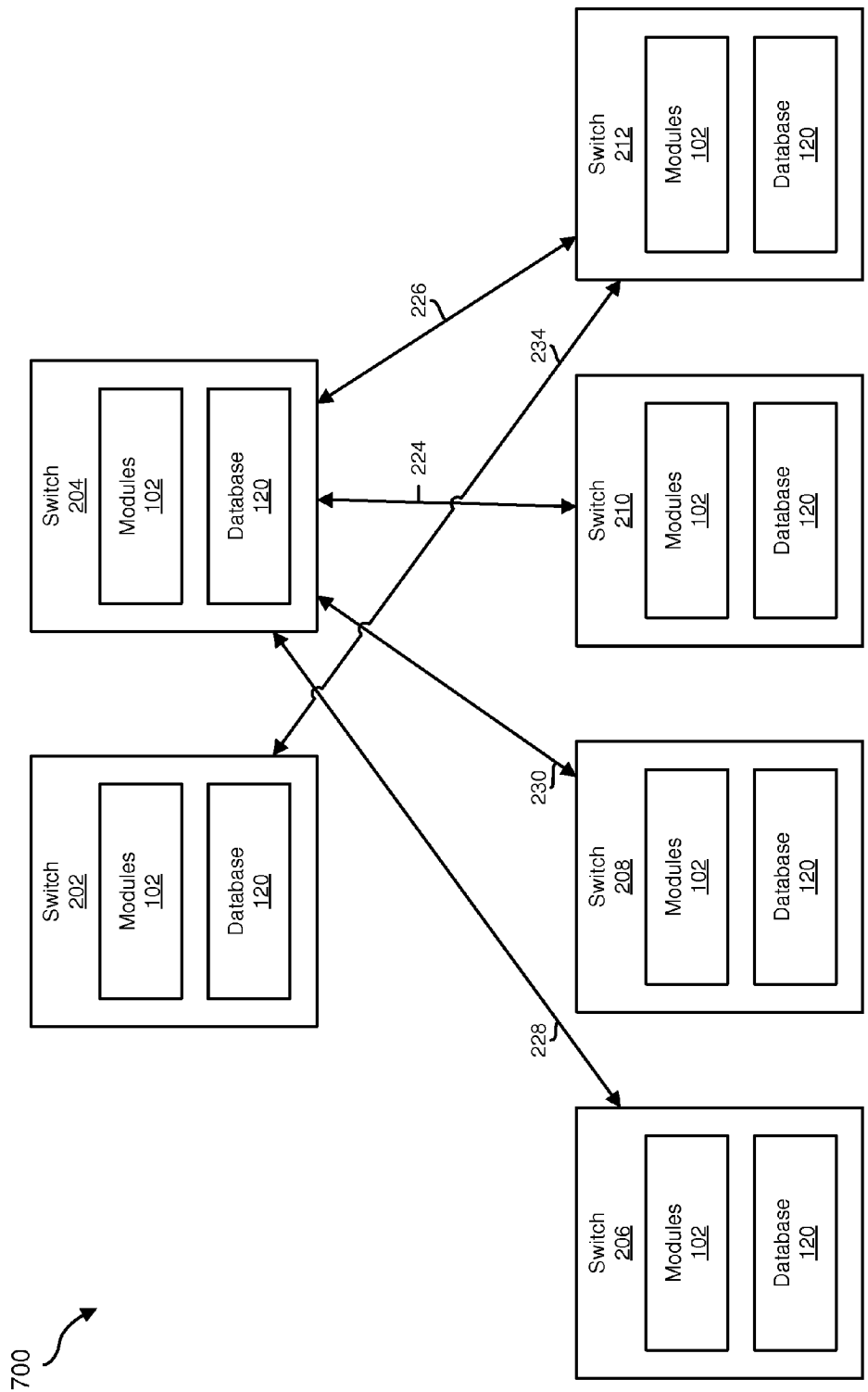
FIG. 7 is a block diagram of an exemplary system for load balancing multicast traffic.

At step 320, one or more of the systems described herein may calculate a plurality of multicast distribution trees for distributing multicast traffic among the plurality of switches identified as part of step 310 that includes (i) a first tree that includes the first path and whose root is different than the root of a second tree and (ii) the second tree that includes the second path. For example, at step 320 calculating module 106 may, as part of switch 206 in FIG. 2, calculate a plurality of multicast distribution trees for distributing multicast traffic among switches 202-212. Using FIGS. 4 and 6 as an example, calculating module 106 may construct distribution tree 400 in FIG. 4 whose root is switch 202 and distribution tree 600 whose root is switch 204. As illustrated in FIGS. 4 and 6, distribution tree 400 may include the path that connects switch 206 to switch 212 through switch 202 via data links 220 and 234, and distribution tree 600 may include the path that connects switch 206 to switch 212 through switch 204 via data links 228 and 226.

The systems described herein may perform step 320 in a variety of ways. In general, calculating module 106 may calculate multicast distribution trees for load balancing multicast traffic amongst a network of switches by (1) selecting two or more of the switches to be the roots of the multicast distribution trees and (2) developing the multicast distribution trees rooted on each selected switch.

Calculating module 106 may select which switches within a network should be roots in a variety of ways. In one example, calculating module 106 may simply select each switch within a network to be a root of a multicast distribution tree. Using FIG. 2 as an example, calculating module 106 may select each of switches 202-212 to be a root of a multicast distribution tree.

Additionally or alternatively, calculating module 106 may select which switches within a network should be roots based on the physical topology of the network (e.g., the physical structure and/or physical interconnection of the switches within the network). For example, in a two-tier network in which some switches act as hubs, calculating module 106 may select the switches that act as hubs to be roots. Using FIG. 2 as an example, calculating module 106 may select switches 202 and 204 to be roots.

In at least one example, calculating module 106 may select roots based on input from an administrator of a network of switches. For example, calculating module 106 may allow an administrator to select which switches in a network should be roots. Additionally or alternatively, calculating module 106 may enable an administrator to indicate criteria for selecting roots.

Upon selecting switches to be roots of multicast distribution trees, calculating module 106 may calculate the multicast distribution trees using any suitable multicast routing algorithm or heuristic. In at least one example, calculating module 106 may calculate a multicast distribution tree rooted on each selected switch using a shortest path algorithm, such as Dijkstra's algorithm. In some examples, calculating module 106 may calculate multicast distribution trees such that path bandwidth and/or number of hops are taken into consideration. In general, calculating module 106 may calculate distribution trees such that each distribution tree includes a path from the root of the distribution tree to each of the plurality of switches.

FIGS. 4-7 illustrate exemplary multicast distribution trees that calculating module 106 may calculate for distributing multicast traffic among switches 202-212 in FIG. 2. Distribution tree 400 in FIG. 4 is a graphical representation of an exemplary multicast distribution tree rooted on switch 202, and distribution tree 600 in FIG. 6 is a graphical representation of an exemplary multicast distribution tree rooted on switch 204. In these examples, distribution tree 400 may represent a set of paths 500 in FIG. 5 through which multicast traffic may be transmitted between switches 202-212 (e.g., the path that connects switch 206 to switch 212 through switch 202 via data links 220 and 234), and distribution tree 600 may represent a set of paths 700 in FIG. 7 through which multicast traffic may also be transmitted between switches 202-212 (e.g., the path that connects switch 206 to switch 212 through switch 204 via data links 228 and 226). As shown, each of distribution trees 400 and 600 may include paths to each of switches 202-212. As such, multicast packets ingress on any one of switches 202-212 may be forwarded to any other of switches 202-212 along either of distribution trees 400 or 600.

In some examples, calculating module 106 may store each calculated multicast distribution tree at each switch within a network. For example, calculating module 106 may store each of multicast distribution trees 400 and 600 at each of switches 202-212. In some examples, calculating module 106 may store a multicast distribution tree at a switch as a list of the interfaces of the switch that connect the switch to the paths represented by the multicast distribution tree. Calculating module 106 may also assign an identifier to the list of interfaces such that the switch can look up the multicast distribution tree when the switch receives multicast packets that should be forwarded across the multicast distribution tree.

Calculating module 106 may calculate multicast distribution trees as part of any switch in a network. In one example, calculating module 106 may calculate a multicast distribution tree as part of the switch that is the root of the multicast distribution tree. Additionally or alternatively, calculating module 106 may calculate a multicast distribution tree as part of a switch that is not the root of the multicast distribution tree.

As illustrated in FIG. 3, at step 330 one or more of the systems described herein may receive a plurality of multicast packets ingress to the plurality of switches at the first switch. For example, at step 330 receiving module 108 may, as part of switch 206 in FIG. 2, receive multicast packets ingress to switches 202-212 from device 214(1).

As used herein, the phrase "multicast packet" may refer to any layer-2 frame and/or layer-3 packet that may be distributed using a flooding algorithm, a spanning-tree algorithm, a reverse-path-forwarding algorithm, a reverse-path-broadcasting algorithm, a truncated-reverse-path-broadcasting algorithm, a reverse-path-multicasting algorithm, a core-based tree algorithm, or any other multicast forwarding algorithm. Examples of multicast packets may include, without limitation, broadcast packets and/or unicast packets with unknown destination addresses. In some examples, the phrase "multicast packet" may refer to a multicast packet of a Virtual Local Area Network (VLAN). Additionally or alternatively, the phrase "multicast packet" may refer to a multicast packet of an Internet Protocol multicast group.

As illustrated in FIG. 3, at step 340 one or more of the systems described herein may use at least two of the plurality of multicast distribution trees calculated at step 320 to transmit the plurality of multicast packets from the first switch to the second switch. For example, at step 340 transmitting module 110 may, as part of one or more of switches 202-212 in FIG. 2, use multicast distribution trees 400 and 600 to transmit multicast packets from switch 206 to switch 212. Upon completion of step 340, exemplary method 300 in FIG. 3 may terminate.

The systems described herein may perform step 340 in a variety of ways. In general, transmitting module 110 may transmit multicast packets using two or more of the multicast distribution trees and a suitable multicast algorithm or protocol (e.g., a flooding algorithm, a spanning-tree algorithm, a reverse-path-forwarding algorithm, a reverse-path-broadcasting algorithm, a truncated-reverse-path-broadcasting algorithm, a reverse-path-multicasting algorithm, a core-based tree algorithm, or any other multicast forwarding algorithm). In the event that the multicast packets are IP multicast packets, transmitting module 110 may use two or more of the multicast distribution trees and a suitable IP multicasting protocol (such as, e.g., Protocol Independent Multicast (PIM), Internet Group Management Protocol (IGMP), or any other protocol for use in multicast communication) to transmit the IP multicast packets from the first switch to the second switch.

In some examples, transmitting module 110 may use at least two multicast distribution trees calculated as part of step 320 to transmit multicast packets ingress at any one switch in a network to other switches in the network. Using FIGS. 4 and 6 as an example, transmitting module 110 may use multicast distribution trees 400 and 600 to transmit multicast packets ingress at switch 206 to switches 208-212, to transmit multicast packets ingress at switch 208 to switches 206, 210, and 212, to transmit multicast packets ingress at switch 210 to switches 206, 208, and 212, and/or to transmit multicast packets ingress at switch 212 to switches 206-210. In some examples, transmitting module 110 may use each multicast distribution tree calculated as part of step 320 to transmit multicast packets ingress at any one switch in a network to other switches in the network.

In some examples, transmitting module 110 may assign the multicast traffic of a multicast group (e.g., a VLAN or an Internet Protocol multicast group) to one or more multicast distribution trees and may transmit multicast packets of the multicast group using the assigned multicast distribution trees. Additionally or alternatively, transmitting module 110 may use different multicast distribution trees to transmit the multicast traffic of two different multicast groups. For example, transmitting module 110 may use one multicast distribution tree to transmit the multicast packets of one of the multicast groups and a different multicast distribution tree to transmit the multicast packets of the other multicast group. Using FIGS. 4 and 6 as an example, transmitting module 110 may use distribution tree 400 rather than distribution tree 600 to transmit multicast packets of a first multicast group and distribution tree 600 rather than distribution tree 400 to transmit the multicast packets of a second multicast group.

As explained above, by load balancing multicast traffic across multiple multicast distribution trees, embodiments of the instant disclosure may substantially improve data-link utilization. For example, by generating multicast distribution trees that may include paths to all switches in a network, embodiments of the instant disclosure may forward multicast packets ingress on a switch from outside of the network to any destination switch in the network along any of the multicast distribution trees. Moreover, by assigning multicast-packet flows (e.g., the multicast-packet flow of a particular Virtual Local Area Network (VLAN)) to multiple multicast distribution trees, embodiments of the instant disclosure may distribute multicast packets ingress on any one switch in a network using different multicast distribution trees and different data links and/or may distribute multicast packets ingress on different switches in the network using the same multicast distribution tree and the same data links.

Figure 8:
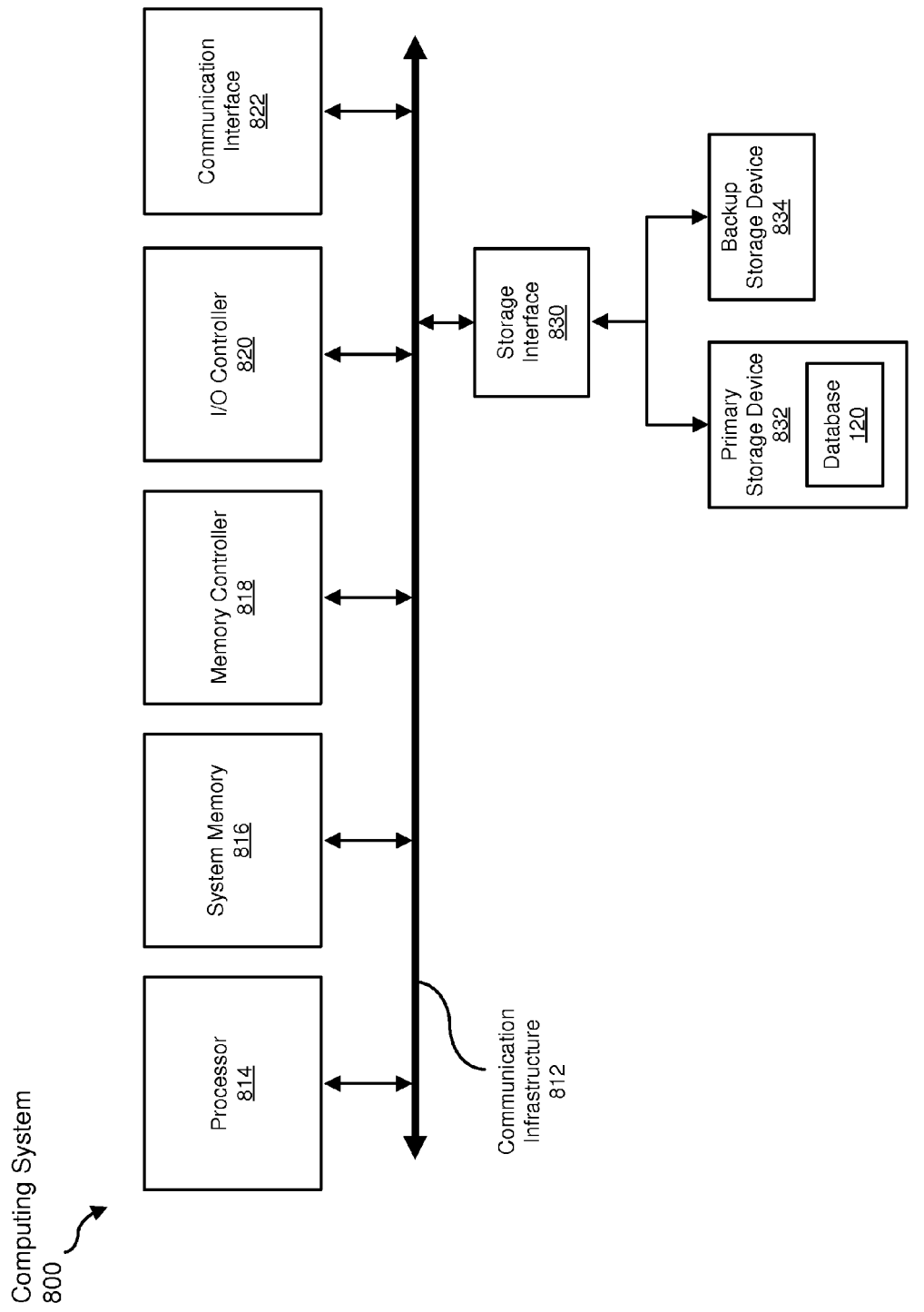
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3. All or a portion of computing system 800 may also perform and/or be a means for performing and/or implementing any other steps, methods, or processes described and/or illustrated herein.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. Processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations. In one example, one or more of modules 102 from FIG. 1 may be loaded into system memory 816.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800. In one example, database 120 from FIG. 1 may be stored in primary storage device 832.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
identifying a plurality of switches that comprise at least a first switch and a second switch, wherein:
the first switch is connected to the second switch by a first path that extends from the first switch to the second switch;
the first switch is also connected to the second switch by a second path that extends from the first switch to the second switch;
calculating a plurality of multicast distribution trees for distributing multicast traffic among the plurality of switches by:
selecting a first root switch from the plurality of switches;
selecting a second root switch from the plurality of switches;
generating a first tree for distributing multicast traffic among the plurality of switches that is rooted on the first root switch and that includes the first path;
generating a second tree for distributing multicast traffic among the plurality of switches that is rooted on the second root switch and that includes the second path, wherein
the first root switch of the first tree is different than the second root switch of the second tree;
receiving a plurality of multicast packets ingress to the plurality of switches at the first switch; and
using, at each switch along the first path, the first tree to transmit a first portion of the plurality of multicast packets from the first switch to the second switch via the first path;
using, at each switch along the second path, the second tree to transmit a second portion of the plurality of multicast packets from the first switch to the second switch via the second path.

2. The method of claim 1, wherein:
the plurality of switches comprise a virtual-chassis fabric that behaves as a single logical switch;
using the first tree and the second tree comprises load balancing the plurality of multicast packets across the first path and the second path.

3. The method of claim 1, wherein calculating the plurality of multicast distribution trees comprises calculating, for each switch in the plurality of switches, a multicast distribution tree rooted on the switch.

4. The method of claim 1, wherein calculating the plurality of multicast distribution trees comprises:
selecting, for each of the multicast distribution trees, one of the plurality of switches to be a root of the multicast distribution tree; and
calculating the multicast distribution tree such that the selected switch is the root of the multicast distribution tree.

5. The method of claim 4, wherein the root of the multicast distribution tree is selected based at least in part on a physical topology of the plurality of switches.

6. The method of claim 4, wherein the root of the multicast distribution tree is selected based at least in part on the root of the multicast distribution tree being a hub.

7. The method of claim 4, wherein the root of the multicast distribution tree is selected based at least in part on input from an administrator of the plurality of switches.

8. The method of claim 4, wherein the multicast distribution tree is calculated by the root of the multicast distribution tree.

9. The method of claim 4, wherein the multicast distribution tree is calculated by one of the plurality of switches that is not the root of the multicast distribution tree.

10. The method of claim 1, wherein each of the plurality of distribution trees comprises a path from the root of the distribution tree to each of the plurality of switches.

11. The method of claim 1, wherein:
calculating the plurality of multicast distribution trees comprises calculating, for each switch in the plurality of switches, a multicast distribution tree rooted on the switch; and
using the first tree and the second tree comprises using each of the plurality of multicast distribution trees to transmit the plurality of multicast packets from the first switch to the second switch.

12. The method of claim 1, wherein the plurality of multicast packets are of a single multicast group.

13. The method of claim 12, wherein the multicast group comprises a virtual area network.

14. The method of claim 12, wherein the multicast group comprises an internet protocol multicast group.

15. The method of claim 1, wherein:
the plurality of multicast packets comprise:
a plurality of multicast packets of a first multicast group; and
a plurality of multicast packets of a second multicast group; and
using the first tree and the second tree comprises:
using the first tree rather than the second tree to transmit the plurality of multicast packets of the first multicast group from the first switch to the second switch; and
using the second tree rather than the first tree to transmit the plurality of multicast packets of the second multicast group from the first switch to the second switch.

16. The method of claim 15, further comprising:
receiving an additional plurality of multicast packets of the first multicast group and an additional plurality of multicast packets of the second multicast group ingress to the plurality of switches at a third switch in the plurality of switches;
using the first tree rather than the second tree to transmit the additional plurality of multicast packets of the first multicast group from the third switch to the second switch; and
using the second tree rather than the first tree to transmit the additional plurality of multicast packets of the second multicast group from the third switch to the second switch.

17. A system comprising:
a memory that stores:
an identifying module that identifies a plurality of switches that comprise at least a first switch and a second switch, wherein:
the first switch is connected to the second switch by a first path that extends from the first switch to the second switch; the first switch is also connected to the second switch by ama~l-a second path that extends from the first switch to the second switch;

a calculating module that calculates a plurality of multicast distribution trees for distributing multicast traffic among the plurality of switches by:
selecting a first root switch from the plurality of switches;
selecting a second root switch from the plurality of switches;
generating a first tree for distributing multicast traffic among the plurality of switches that is rooted on the first root switch and that includes the first path;
generating a second tree for distributing multicast traffic among the plurality of switches that is rooted on the second root switch and that includes the second path, wherein
a receiving module that receives a plurality of multicast packets ingress to the plurality of switches at the first switch; a transmitting module that: uses, at each switch along the first path, the first tree to transmit a first portion of the plurality of multicast packets from the first switch to the second switch via the first path;
uses, at each switch along the second path, the second tree to transmit a second portion of the plurality of multicast packets from the first switch to the second switch via the second path; and
at least one physical processor coupled to the memory that executes the identifying module, the calculating module, the receiving module, and the transmitting module.

18. The system of claim 17, wherein:
the plurality of switches comprise a virtual-chassis fabric that behaves as a single logical switch
the transmitting module uses the first tree and the second tree to load balance the plurality of multicast packets across the first path and the second path.

19. The system of claim 17, wherein the calculating module calculates the plurality of multicast distribution trees by calculating, for each switch in the plurality of switches, a multicast distribution tree rooted on the switch.

20. A non-transitory computer-readable medium comprising one or more computer-executable instructions that, when executed by at least one processor of at least one network device, cause the network device to:
identify a plurality of switches that comprise at least a first switch and a second switch, wherein:
the first switch is connected to the second switch by a first path that extends from the first switch to the second switch;
the first switch is also connected to the second switch by a second path that extends from the first switch to the second switch;
calculate a plurality of multicast distribution trees for distributing multicast traffic among the plurality of switches by:
selecting a first root switch from the plurality of switches;
selecting a second root switch from the plurality of switches;
generating a first tree for distributing multicast traffic among the plurality of switches that is rooted on the first root switch and that includes the first path;
generating a second tree for distributing multicast traffic among the plurality of switches that is rooted on the second root switch and that includes the second path, wherein
the first root switch of the first tree is different than the second root switch of the second tree;
receive a plurality of multicast packets ingress to the plurality of switches at the first switch; and
use, at each switch along the first path, the first tree to transmit a first portion of the plurality of multicast packets from the first switch to the second switch via the first path;
use, at each switch along the second path, the second tree to transmit a second portion of the plurality of multicast packets from the first switch to the second switch via the second path.

\* \* \* \* \*